United States Patent
Thomas-Alyea et al.

(10) Patent No.: US 10,476,080 B2
(45) Date of Patent: Nov. 12, 2019

(54) ELECTRODE CONTAINING BOTH ANION-ABSORBING AND CATION-ABSORBING ACTIVE MATERIALS

(71) Applicant: Samsung Electronics Co., Ltd., Suwon-si, Gyeonggi-Do (KR)

(72) Inventors: Karen E. Thomas-Alyea, Arlington, MA (US); Masoud Aryanpour, Malden, MA (US); Jeong-Ju Cho, Mountain View, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 263 days.

(21) Appl. No.: 15/335,815

(22) Filed: Oct. 27, 2016

(65) Prior Publication Data
US 2017/0207458 A1    Jul. 20, 2017

Related U.S. Application Data

(60) Provisional application No. 62/280,600, filed on Jan. 19, 2016, provisional application No. 62/346,842, filed on Jun. 7, 2016.

(51) Int. Cl.
| | |
|---|---|
| *H01M 10/38* | (2006.01) |
| *H01M 10/36* | (2010.01) |
| *H01M 4/58* | (2010.01) |
| *H01M 4/583* | (2010.01) |
| *H01M 4/587* | (2010.01) |
| *H01M 4/60* | (2006.01) |
| *H01M 10/39* | (2006.01) |
| *H01M 4/02* | (2006.01) |

(52) U.S. Cl.
CPC ........... *H01M 4/583* (2013.01); *H01M 4/602* (2013.01); *H01M 10/36* (2013.01); *H01M 10/38* (2013.01); *H01M 10/399* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 8,574,790 B2 | 11/2013 | Sinha et al. | |
| 8,586,238 B2 | 11/2013 | Chiang et al. | |
| 8,709,647 B2 | 4/2014 | Gozdz et al. | |
| 8,920,974 B2 | 12/2014 | Choi et al. | |
| 8,927,068 B2 | 1/2015 | Brown et al. | |
| 8,945,668 B2 | 2/2015 | Sim et al. | |
| 8,945,766 B2 | 2/2015 | Yoshida et al. | |
| 8,974,944 B2 | 3/2015 | Kim et al. | |
| 9,054,383 B2 | 6/2015 | Roev et al. | |
| 2003/0198866 A1* | 10/2003 | Tanjou | H01M 10/0525 429/149 |
| 2010/0035152 A1 | 2/2010 | Sastry et al. | |
| 2011/0168550 A1 | 7/2011 | Wang et al. | |
| 2012/0231346 A1 | 9/2012 | Tsujii et al. | |
| 2012/0251896 A1 | 10/2012 | Chiang et al. | |
| 2012/0328942 A1* | 12/2012 | Thomas-Alyea | H01M 4/587 429/211 |
| 2013/0029234 A1 | 1/2013 | Roev et al. | |
| 2015/0140443 A1 | 5/2015 | Takahashi et al. | |

FOREIGN PATENT DOCUMENTS

| | | |
|---|---|---|
| WO | 2011087588 A2 | 7/2011 |
| WO | 20140189920 A1 | 11/2014 |
| WO | 20150032950 A1 | 3/2015 |

OTHER PUBLICATIONS

Osinska-Broniarz et al, Hydrogel Alkaline Electrolytes for Ni—MH Batteries, 69 Chemic, 852-861 (Year: 2015).*
Fuller, et al., "Simulation and Optimization of the Dual Lithium Ion Insertion Cell," Technical Papers, Electrochemical Science and Technology, J. Electrochem. Soc., vol. 141, No. 1, Jan. 1994, pp. 1-10.
Janoschka, et al., "Powering up the Future: Radical Polymers for Battery Applications," Advanced Materials, 2012, 24, pp. 6397-6409.
Nakahara, et al., Electrolyte anion-assisted charge transportation in poly(oxoammonium cation/nitroxyl radical) redox gels, Journals of Materials Chemistry, 2012, 22, pp. 13669-13673.
Nishide, et al., "Organic Radical Battery," The Electrochemical Society, Interface, Winter 2005, pp. 32-36.
Niishide, et al., "Organic radical battery: nitroxide polymers as a cathode-active material," Electrochimica Acta 50 (2004), pp. 827-831.
Oyaizu, et al., "Synthesis and Charge Transport Properties of Redox-Active Nitroxide Polyethers with Large Site Density," Macromolecules, vol. 43, No. 24, 2010, pp. 10382-10389.
Thomas-Alyea, et al., "Modeling the Behavior of Electroactive Polymers for Overcharge Protection of Lithium Batteries," Journal of the Electrochemical Society, 151 (4), pp. A509-A521, 2004.

(Continued)

*Primary Examiner* — Yoshitoshi Takeuchi
(74) *Attorney, Agent, or Firm* — Cantor Colburn LLP (57) ABSTRACT

An electrode is provided having a front region adjacent to a separator and a back region adjacent to a current collector. The electrode includes an anion-absorbing material and a cation-absorbing material. The electrode exhibits a compositional profile such that the anion-absorbing material is present at a higher volume percent at the back region than at the front region. Also provided are electrochemical cells that employ such an electrode as a positive electrode. Optionally, the cells include an electrolyte comprised of a solution of a solvent and a salt dissolved therein at a concentration of at least about 2M when the cell is in a fully discharged state.

26 Claims, 5 Drawing Sheets

(56) References Cited

OTHER PUBLICATIONS

Vlad, et al., "Exploring the Potential of Polymer Battery Cathodes with Electrically Conductive Molecular Backbone", Journal of Materials Chemistry A, 2015; vol. 3, pp. 11189-11193.
Vlad, et al., "Hybrid Supercapacitor-Battery Materials for Fast Electrochemical Charge Storage", Scientific Reports, 4 : 4325, Mar. 7, 2014; 7 pages.
Wolf, "Recent Advances in Conjugated Transition Metal-Containing Polymers and Materials", Journal of Inorganic and Organometallic Polymers and Materials, vol. 16, No. 3, Sep. 2006, pp. 189-199.

* cited by examiner

ELECTRODE CONTAINING BOTH ANION-ABSORBING AND CATION-ABSORBING ACTIVE MATERIALS

RELATED APPLICATIONS

This application claims the benefit, under 35 U.S.C. § 119(e), of U.S. Provisional Patent Application Ser. No. 62/280,600, entitled "Electrode Containing both Anion-Absorbing and Cation-Absorbing Active Materials," filed on Jan. 19, 2016, and of U.S. Provisional Application Ser. No. 62/346,842, entitled "Electrode Containing both Anion-Absorbing and Cation-Absorbing Active Materials," filed on Jun. 7, 2016. Each of the above-identified provisional applications is hereby incorporated by reference in its entirety.

BACKGROUND

For mobile devices, automotive, and other applications, it can be important to have both a high volumetric energy density and a high-rate charge capability for electrochemical batteries and cells. To achieve both goals, one should consider the composition of the electrode materials, the construction of the electrodes, the chemical make-up of the electrolyte, and interfacial aspects of the cells. In other words, from a theoretical perspective, both thermodynamic and kinetic considerations, which are sometimes at odds with each other, should be addressed in order to meet increasingly stringent user demand for high performance electrochemical cells.

For example, there are many competing factors to consider when optimizing a cell's volumetric energy density and rate capability. Volumetric energy density can generally be increased by using electrode materials with high capacity, high redox voltage, and high density and by using electrodes with low porosity, large thickness, and low amounts of inactive components such as binders and conductive additives. Inorganic cathode compounds such as lithium cobalt oxide are generally considered to have high capacity, high redox voltage, and high density. Rate capability, in theory, may be increased by minimizing solid-phase diffusion in favor of surface reactions, e.g., by increasing surface area of anode and/or cathode reactive materials. Such increases in surface areas may alter electrode void volumes.

In addition, electroactive polymeric materials may be used in electrochemical cells. As a general rule, organic radical polymers (ORP), for example, can have high-rate charge capability. However, they also generally have low volumetric energy density. That said, many anion-absorbing polymers are considered to have rapid solid-phase diffusion because of short diffusion path lengths. When such materials are used in one or more electrodes or in an electrolyte, they may theoretically enhance the kinetics associated with enhanced cell rate capabilities.

Rate capability can also be increased by using an electrolyte with a high mobility for the active ion and ensuring that the porosity in the electrode and/or separator materials is sufficient to provide sufficient transport of ions across the cell and avoid the formation of large concentration gradients. It has been theorized that concentration gradients form in all lithium-ion batteries because of transport of the cation from the positive electrode to the negative electrode during charge. If the concentration of an ion or salt in a region of the negative electrode falls to zero, then the reaction of lithium ions with the negative active material cannot proceed in that region. That is, salt depletion may represent a major factor that limits the charge rate capability of electrochemical cells or batteries.

Thus, solutions are needed to avoid exacerbating electrochemical performance problems such as those associated with salt depletion. As discussed below, such solutions may involve, for example: providing electrodes that exhibit a compositional profile such that the anion-absorbing material is present at different volume percentages at the back region relative to the front region of an electrode; using an electrolyte at a sufficiently high enough concentration when the cell is in a fully discharged state; and other techniques that may synergistically operate to enhance charge rate capabilities of electrochemical cells.

SUMMARY

In a first embodiment, an electrode is provided having a front region adjacent to a separator and a back region adjacent to a current collector. The electrode comprises an anion-absorbing material (AAM) and a cation-absorbing material (CAM). The electrode exhibits a compositional profile such that the anion-absorbing material is present at a higher volume percent at the back region than at the front region.

In another embodiment, the electrode may be included as a positive electrode in an electrochemical cell. Such a cell may include, for example, a negative electrode containing a negative electrode material, a positive electrode containing a positive electrode material. A separator is interposed between the negative and positive electrodes. An electrolyte fills the separator and electrode pores.

In still another embodiment, an electrochemical cell is provided comprising a negative electrode containing a negative electrode material and a positive electrode containing an inorganic positive electrode material and an anion-absorbing material. A separator is interposed between the negative and positive electrodes. An electrolyte fills the separator and electrode pores and is comprised of a solution of a solvent and a salt dissolved thereby at a concentration of at least about 2M when the cell is in a fully discharged state.

DETAILED DESCRIPTION

The terminology used herein is for the purpose of describing particular embodiments only, and is not intended to be limiting. In addition, in this specification and in the claims that follow, reference is made to a number of terms that are defined to have the following meanings, unless the context in which they are employed clearly indicates otherwise.

As used herein, the singular forms "a," "an," and "the" include both singular and plural referents unless the context clearly dictates otherwise. Thus, for example, reference to "an electrode" includes one or more electrodes, reference to "a salt" includes a combination of salts as well as a single salt, and the like.

Unless expressly indicated otherwise or indicated otherwise by context, the term "anode" is used interchangeably with the term "negative electrode," and the term "cathode" is used interchangeably with the term "positive electrode."

In a first embodiment, then, an electrode is provided having a front region adjacent to a separator and a back region adjacent to a current collector. The electrode includes an anion-absorbing material (AAM) and a cation-absorbing material (CAM). The electrode exhibits a compositional profile such that the anion-absorbing material is present at a higher volume percent at the back region than at the front region.

In some cases, the composition profile may be a graded type of compositional profile. For example, a smooth gradient compositional profile may be provided. Alternatively, a stepwise compositional profile may be provided.

The graded composition profile may be provided as a plurality of regions having different volume percentages of the anion-absorbing material and/or of the cation-absorbing material, the regions including at least the front and back regions. The front region may comprise about 0 to about 4 volume percent of the anion-absorbing material. The back region may comprise about 5 to about 20 volume percent, or more specifically, about 8 to about 12 volume percent of the anion-absorbing material.

The anion-absorbing material typically includes a polymer or a carbonaceous material. The polymer may be comprised of monomer units of selected from one or more redox groups, e.g., organic radicals such as nitroxyl groups. The polymer may be conjugated.

The cation typically comprises an alkali or alkaline-earth metal. In some cases, the electrolyte contains a solvent—organic, inorganic, or otherwise—and a salt at a concentration of at least 2M. For example, the salt may be present at a concentration of about 3M to about 6M or at a concentration of about 4.5M to about 6M.

In another embodiment, an electrochemical cell is provided comprising: a negative electrode containing a negative electrode material; a positive electrode containing an inorganic positive electrode material and an anion-absorbing material; a separator interposed between the negative and positive electrodes; and an electrolyte filling the separator and electrode pores. The electrolyte is comprised of a solution of a solvent and a salt dissolved thereby at a concentration of at least about 2M when the cell is in a fully discharged state.

The electrode exhibits a compositional profile such that the AAM is present at a higher volume percent at the back region than at the front region. The compositional profile of the electrode may be particularly useful to overcome the problem of salt depletion and thereby provide superior volumetric charge rate capability as compared to an electrode with a uniform composition. The electrode may be used as a positive electrode in an electrochemical cell that includes a negative electrode containing a negative electrode material, a positive electrode containing a positive electrode material, a separator interposed between the negative and positive electrodes, and an electrolyte filling the separator and electrode pores.

In an example embodiment, an electrode of a battery includes a graded composition, in which AAM is mixed with CAM. In this embodiment, the composition of the mixture is varied across the thickness of the electrode. The AAM volume percentage is lower (e.g., less than about 2 vol %) at the front region close to the separator and is higher (e.g., greater than about 5 vol %) at the back region close to the current collector.

In further embodiments, the electrolyte may comprise one or more salts. Furthermore, the electrolyte can comprise one or more solvents and one or more additives. For example, in some embodiments when the cell is in the fully discharged state, the electrolyte may have an average salt concentration greater than about 2 M. In particular, the average salt concentration may be between about 3 M and about 6 M or between about 4.5 M and about 6 M in various embodiments. In an example embodiment, the anion of the salt may comprise bis(fluorosulfonyl)imide or FSI ($N(SO_2F)_2^-$). In some embodiments, the solvent may comprise one or more of acetonitrile, ester, glyme, cyclic or linear carbonate, or ether.

Optionally, the electrolyte is aqueous in nature. Other ionic liquids such as molten salts can be used as an electrolyte. Such salts may be alkali in nature and may include, for example, Li or Na as anions.

Graded Composition

By mixing the AAM into the positive electrode of a lithium-ion battery with a lower AAM volume percentage adjacent to the separator and higher AAM volume percentage adjacent to the current collector, the volumetric charge rate capability can be improved while avoiding salt depletion at the negative electrode. An electrode with graded composition may provide superior volumetric charge rate capability compared to an electrode with uniform composition.

Organic radical polymers (ORP) can be combined with inorganic materials for lithium-ion battery cathodes (e.g., lithium iron phosphate (LFP)) in order to improve cell rate capability. However, the salt in the electrolyte is consumed during charge of the ORP, because the ORP absorbs anions during charge, while the negative electrode absorbs the cation (lithium ion) during charge. This differs from many lithium-ion battery materials, in which the positive electrode releases lithium ions during charge, so there is no change in overall salt content of the electrolyte.

Experimental work has been performed in laboratory cells with excess electrolyte and high porosity electrodes. These laboratory cells have low volumetric energy density. However, for mobile and automotive applications, it is often important to have high volumetric energy density. Simulations indicate that, in a practical high-energy-density configuration, salt consumption may adversely impact charge rate capability because of insufficient cation transport to the negative electrode. For example, for a typical high-energy cell design with electrode coating thickness of about 70 μm and porosity of about 0.3, if an anion-absorbing polymer such as PTMA (poly(2,2,6,6-tetramethylpiperidinyloxy-4-yl methacrylate)) occupies 5% of the volume fraction of the positive electrode, then the average salt concentration in the fully charged cell will be about 0.4 M lower than the average salt concentration in the fully discharged cell. This decrease in overall salt concentration exacerbates the concentration gradients that form during absorption of cations into the negative electrode during charge. Example embodiments disclosed herein are designed/constructed to overcome this obstacle.

Based on the electrochemical reaction and ion transport within the battery, example embodiments have a design/construction that reduces the negative effects of salt depletion, with composite electrodes containing both AAM and cation-absorbing material (CAM). If the AAM is distributed nonuniformly across the electrode, with small to zero AAM volume percentage close to the separator, and higher AAM volume percentage close to the current collector of the positive electrode (referred to as a "graded" composition herein), then the consumption of salt by the AAM may not adversely impact the performance of the negative electrode. The region of the electrode that borders the separator is referred to as the "front" of the electrode, and the region of the electrode that borders the current collector is referred to as the "back" of the electrode.

Simulations indicate that the AAM-CAM composite electrode with uniform AAM composition would degrade rate capability relative to a CAM electrode without AAM, whereas an AAM-CAM composite electrode with graded AAM composition, with low AAM composition at the front, may show greater than 2% improvement in volumetric charge rate capability.

Figure 1:
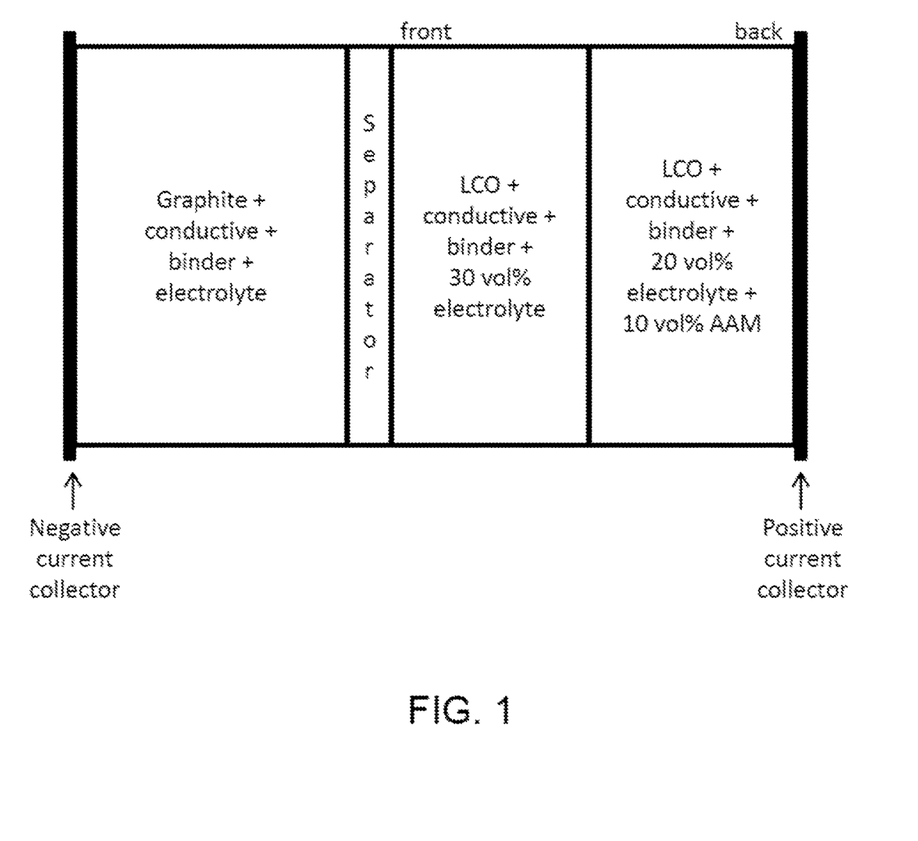
FIG. 1 depicts an electrochemical cell having a positive electrode with a graded composition of AAM.

In particular, FIG. 1 shows a positive electrode in an example electrochemical cell. The positive electrode has two regions, front and back, as discussed above. In this example, both regions contain a CAM such as lithium cobalt oxide (LCO), mixed with conductive agent and binder. The back region has a higher volume percent of AAM than the front region. For example, the volume percent of AAM can be measured as an average of the corresponding region. In an example embodiment, the front region contains no AAM. The void volume of the front in this example can be about 30%. In some embodiments, the void volume may be a volume that provides a space for holding electrolyte when the electrode is assembled. into a cell. The back region may include the AAM, such as an organic radical polymer or conjugated polymer. In this example, in a dry state, the AAM may occupy approximately about 10% of the electrode volume, and the void volume may be about 20%.

Other distributions of the AAM material within the positive electrode material can be used in example embodiments disclosed herein and in other example embodiments not specifically discussed. For example, the AAM can be distributed such that the front region has a lower volume percent of AAM than the back region, where the front and back regions are any regions of the positive electrode such that the front region is closer to the negative electrode than the back region is. The front region need not be devoid of AAM; instead it may include some AAM. Moreover, there need not be a discontinuity of the volume percent of AAM between front and back regions. For example, the front and back regions can have an AAM volume percent that varies in a gradient manner such that the AAM volume percent increases approximately smoothly as a function of distance from the separator-positive electrode interface. Exemplary ranges for the AAM volume percent are discussed herein below.

Figure 2A:
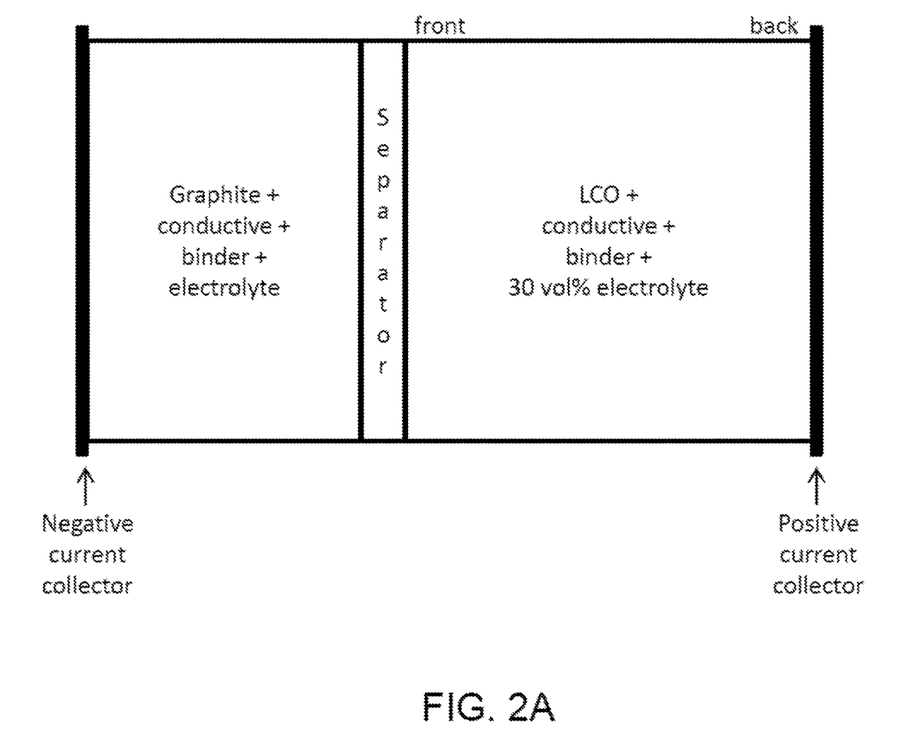
FIG. 2A depicts an electrochemical cell having a positive electrode without a graded composition of AAM, in which the positive electrode includes only CAM and no AAM.
Figure 2B:
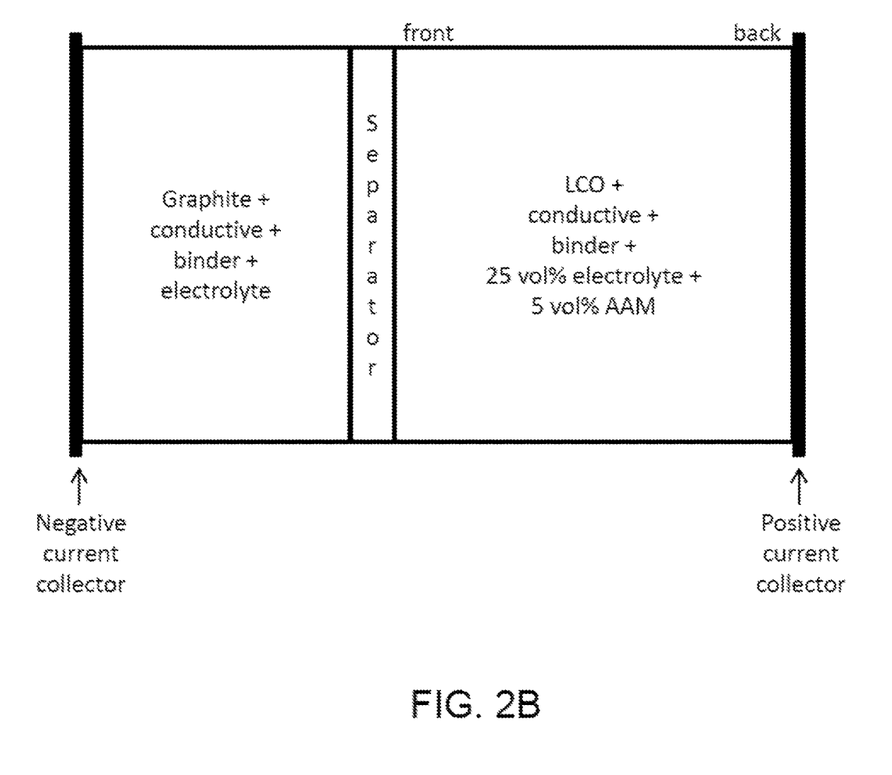
FIG. 2B depicts an electrochemical cell having a positive electrode without a graded composition of AA Min which, the positive electrode includes only a mixture of AAM and CAM, with AAM uniformly distributed.

FIGS. 2A and 2B show how electrode design/construction may vary according to theoretical aspects of charging kinetics and energy density. FIGS. 2A and 2B show examples of battery structures that do not include graded AAM. FIG. 2A shows an example electrode with only CAM, no AAM, and void volume of 30%. FIG. 2B shows an example electrode comprising of a mixture of AAM with CAM, with AAM uniformly distributed across the thickness of the electrode. In this example, the volume percentage of AAM is 5% and the void volume is 25%. In all of the examples, the positive electrode may have the same thickness and same amount of CAM. The examples with AAM may have higher volumetric capacity because of the contribution of the AAM.

Alternatively, there is AAM in the front of the electrode, but no AAM in the back of the electrode. The total volume of active material, AAM, and electrolyte may be the same or different among FIGS. 1 and 2B. The examples shown may also differ in the spatial distribution of the electrolyte and AAM volume.

The redox potential of the AAM may coincide with the redox potential of the CAM. For example, with LCO, which has a redox potential that ranges from 3.9 to 4.2 V vs. Li, one would generally use an AAM with a redox potential greater than or about 3.9 V to maximize cell energy density.

The electrolyte may comprise a salt, e.g., $LiPF_6$, in a solvent, e.g., a blend of ethylene carbonate, ethyl methyl carbonate, and dimethyl carbonate. Such carbonate electrolytes generally show a maximum in ionic conductivity at a salt concentration of about 1.05 M. To provide extra salt for consumption by the AAM, the salt concentration in some embodiments may be assumed to be 1.25 M when the cell is fully discharged.

Figure 3:
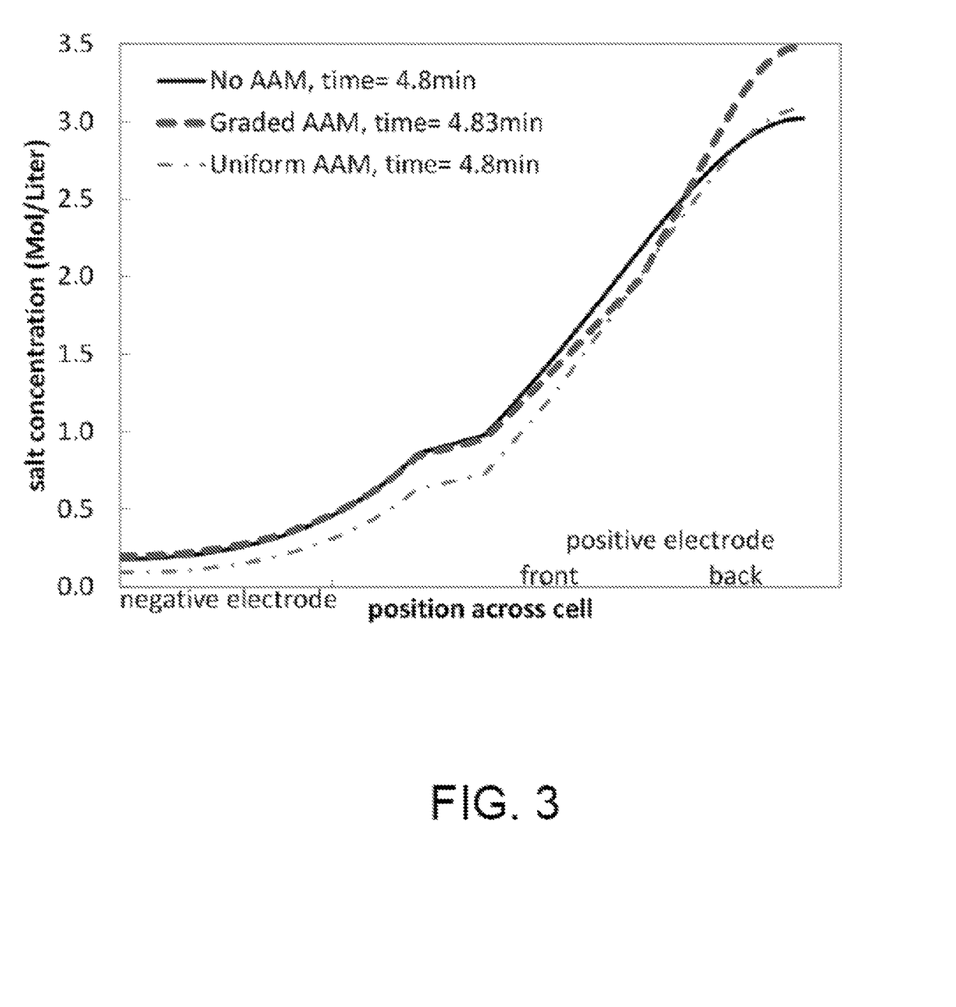
FIG. 3 shows the distribution of salt across the thickness of the cell after charging for 4.5 minutes.

FIG. 3 shows the distribution of salt across the thickness of the cell after charging for 4.5 minutes. In this example, when the LCO is charged, lithium ions are produced in the electrolyte, causing the concentration in the electrolyte to increase. At the graphite negative electrode, lithium ions go out of the electrolyte into the graphite, causing the concentration in the electrolyte to decrease. Lithium ions are transported from the positive electrode to the negative electrode by migration and diffusion. For example, in the cell depicted in FIG. 2B (AAM uniformly mixed with LCO at 5% volume percentage), by 4.5 minutes, the electrolyte concentration in the back of the negative electrode is near zero, which substantially reduces the rate of reaction in the back of the electrode. Because of the lower volume percentage of electrolyte in the front of the positive electrode, transport of lithium ions out of the back of the positive electrode is impeded, so salt concentration is higher in the back of the positive electrode. In contrast, in the cell shown in FIG. 1 (AAM composition is graded, 0 vol % in the front and 10 vol % in the back), the salt concentration in the front of the positive electrode is similar to the case with no AAM. The salt concentration in the middle of the positive electrode is reduced because of consumption by the AAM. Since conductivity has a maximum at about 1.05 M, reducing the salt concentration in the middle of the positive electrode serves to improve the conductivity and reduce cell resistance.

Figure 4:
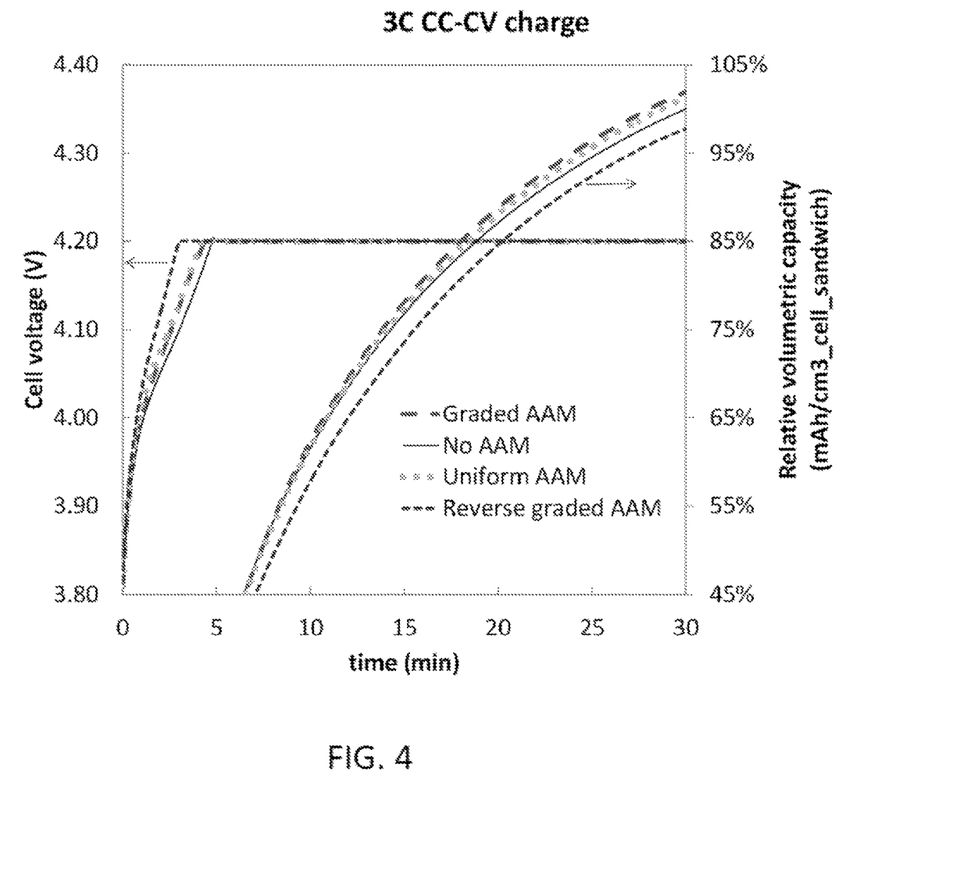
FIG. 4 shows cell voltage and capacity over time during charge for various cathode constructions.

FIG. 4 shows cell voltage and capacity over time during charging, in which example results are shown for a 3 C charge starting from 0% SOC. In other words, the cell is in the fully discharged state at time zero. Current, of a magnitude equal to three times the nominal capacity of the cell, is applied to charge the cell. When the cell voltage reaches 4.2 V, the voltage is held constant and the current decreases.

Cell performance was simulated using the model framework described by Fuller, Doyle, and Newman (J. Electrochem. Soc. 1994 vol. 141 p. 1) and Thomas-Alyea et al. (J. Electrochem. Soc. 2004 vol. 151 p. A509). In the positive electrode, there are two active materials (CAM and AAM), each with its own reaction rate described by its own Butler-Volmer equation. The current balance includes the amount of charge consumed by both reactions. The material balance for the anion in the electrolyte includes consumption by absorption into the AAM. By electroneutrality in the electrolyte, the concentration of anion is equal to the concentration of cation.

Results are shown for: no AAM, graded AAM, and uniform AAM. A higher rate capability is seen with the graded design/construction. A lower rate capability is seen with the reverse-graded design/construction, because having a high amount of AAM close to the separator exacerbates salt depletion in the negative electrode.

The AAM may be selected from a variety of organic radical polymers, such as PTMA (poly(2,2,6,6-tetramethyl-piperidinyloxy-4-yl methacrylate)) and PTVE (poly(1-oxy-2,2,6,6-tetramethylpiperidin-4-yl vinyl ether)). Monomers for such organic radical polymers include include nitroxyl radicals, such as TEMPO (2,2,6,6 tetramethyl piperidinyloxyl), PROXYL (2,2,5,5 tetramethyl pyrrolidinyloxyl), spirobisnitroxides, and arylnitroxides. Additional, backbone structures and monomer structures that can be made into organic radical polymers can be found, e.g., in K. Oyaizu et al., Macromolecules 2010 vol 43 p. 10382; H. Nishide and T. Suga, Electrochemical Society Interface, Winter 2005 p. 32; T. Janoschka, M. D. Hager, and U. S. Schubert, Advanced Materials 2012 vol. 24 p. 6397; A. Vlad, K. Arnould, B. Ernould, L. Sieuw, J. Rolland, and J.-F. Gohy, J. Mater. Chem. A, 2015 vol. 3 p. 11189; M. O. Wolf, J. Inorganic and Organometallic Polymers and Materials 2006 vol. 16 p. 189. Any of these polymeric moieties may be modified with substituents to improve manufacturability, chemical and electrochemical stability, insolubility in the electrolyte, or other desirable properties.

Polymer backbones may include poly(methacrylate), poly(acetylene), poly(norbornene), poly(styrene), poly(vinylether), poly(ethylene glycol), and poly(methyl siloxane). Selected co-polymers may be used to improve manufacturability, insolubility in the electrolyte, or other desirable properties.

Other suitable polymers include but are not limited to quinones, such as poly(2,5 dimethoxyaniline) and poly(2,5, dihydroxyaniline).

The AAM may be graphite, or the AAM may be a conjugated polymer, such as poly(thiophene), poly(pyrrole), poly(aniline), or poly(fluorene). There are many substituents that can be attached to the monomer units to modify the physical and electrochemical properties of the conjugated polymer, for example, the capacity, oxidation potential, and/or solubility. The polymer may include poly[M(Schiff)] or metal-Salen-type polymers. See, e.g., Wolf, (2006) "Recent Advances in Conjugated Metal-containing Polymers and Materials," J. of Inorganic and Organometallic Polymers and Materials, Vol. 16, No. 3, pp 189-99. The AAM may be synthesized directly onto the CAM, e.g., by electropolymerization.

In some embodiments, the CAM may be a metal oxide, such as $Li_vA_xB_yC_zD_wO_2$, where A can be cobalt, B can be nickel, C can be manganese, D can be a transition metal or alkali metal or alkaline earth metal or halogen. The structure can be layered, overlithiated, or spinel. The CAM may be a metal phosphate, such as lithium iron phosphate or lithium manganese phosphate. The CAM may comprise one or more of these materials.

In some embodiments, the CAM is an inorganic material with high volumetric energy density, and the AAM is a polymer with high rate capability. The volumetric energy density of the electrode is maximized by giving no additional volume to the AAM. In other words, the AAM occupies volume that would otherwise be occupied by electrolyte in the porous electrode.

In an alternative embodiment, the sum of (AAM volume percentage+electrolyte volume percentage) in the back of the electrode is higher than the electrolyte volume percentage in the front of the electrode.

Although example lithium ion batteries have been discussed, the battery may be a sodium-ion battery.

In some embodiments, the negative electrode may be comprised of graphite, soft carbon, or hard carbon; $Li_4Ti_5O_{12}$; alloys or intermetallics of Li (or Na) with Si, Sn, Al, or CuSb; $LiTiO_2$; or other anode materials used in lithium-ion or sodium-ion batteries. The negative electrode may be lithium metal or sodium metal.

The cell may be configured in a variety of ways including but not limited to a prismatic stacked format, prismatic wound format, cylindrical spiral-wound format, coin cell, or other configuration used for lithium and lithium-ion batteries or sodium ion batteries.

In battery device fabrication, electropolymerization can be used to introduce the AAM material in controlled amounts into the positive electrode. In an example fabrication process, an electrode containing CAM may be fabricated, e.g., by slurry coating onto metal foil. Then, the CAM electrode may be passed through a bath containing a monomer of the AAM, and current may passed to polymerize the AAM. Using known electrochemical techniques, the conditions of the bath composition and applied voltage can be selected to produce the desired gradient in AAM composition across the thickness of the electrode. Alternatively, the AAM can be included in the positive electrode slurry during fabrication of the positive electrode layer. Before the slurry dries, an electromagnetic field can be applied at the surface of the positive electrode to cause migration of the AAM material. The field can be applied to cause a gradient distribution of AAM and the slurry then can be dried to fix the gradient distribution of AAM.

In other embodiments, the front and back regions can be formed by coating two or more layers, the layers formed from sources having different volume percentages of the AAM. The coating can be done with separate coating passes for each composition or via a single-pass multi-layer coating process such as cascade coating. Notably, this multi-layer coating process may still yield a continuous gradient of the AAM depending on the coating and drying conditions, as solvent evaporation can push the polymer towards the front of the electrode, a phenomenon referred to hereinafter as "binder migration." Binder migration may be maximized, minimized, or otherwise controlled to provide optimal electrode performance.

Electrolyte

In accordance with various embodiments, the electrolyte comprises one or more salts. Furthermore, the electrolyte may comprise one or more solvents and one or more additives. In an example embodiment, when the cell is in the fully discharged state, the electrolyte may have an average salt concentration greater than about 2 M, between about 3 M and about 6 M, or between about 4.5 M and about 6 M.

In an example embodiment, the anion of the salt comprises FSI ($N(SO_2F)_2^-$). For lithium ion systems, the high conductivity of LiFSI enables use of highly concentrated electrolytes. In turn, the risk of salt depletion is mitigated. In addition, higher rate capabilities are enabled, thereby allowing for the use of thicker electrodes. Furthermore, LiFSI enables the AAM to increase cell energy and power density. In any case, it should be noted that the AAM potential can decrease by about 0.3V if salt concentration is raised to about 4M, thereby increasing the difficulty of finding an AAM with a useful range of redox potential.

In other embodiments, the anion of the salt comprises one or more of FSI, bis(oxalo borate); perchlorate; hexafluorophosphate; tetrafluoro borate; trifluoro methane sulfanyl imide; or triflate. The electrolyte may be an ionic liquid.

In an example embodiment, the solvent comprises one or more of acetonitrile, ester, glyme, cyclic or linear carbonate, or ether.

The amount of AAM in the AAM-CAM composite electrode may be selected such that in the fully charged state, the average concentration of salt is greater than about 3 M, in order to ensure that the passivation layer on the negative electrode remains intact. For example, the moles of salt per area in the electrolyte of the fully discharge cell may be equal to:

$$c_{init} * (L_+ \varepsilon_{e,+} + L_s \varepsilon_{e,s} + L_- \varepsilon_{e,-}),$$

where L is thickness, $\varepsilon_e$ is volume percentage of electrolyte, $c_{init}$ is the concentration of the electrolyte when the cell is assembled, + indicates positive electrode, s indicates separator, and − indicates negative electrode. The moles of salt consumed by the AAM per area is equal to $L_+ \varepsilon_{AAM} Cap_{AAM}$, where $\varepsilon_{AAM}$ is the volume-averaged volume percentage of AAM across the thickness of the positive electrode and $Cap_{AAM}$ is the specific capacity of the AAM expressed in equivalents per volume of AAM material. Then the allowable volume percentage for AAM is given by:

$$L_+ \varepsilon_{AAM} Cap_{AAM} <= (c_{init} - c_{min}) * (L_+ \varepsilon_{e,+} + L_s \varepsilon_{e,s} + L_- \varepsilon_{e,-})$$

where $c_{min}$ is the minimum salt concentration necessary to ensure passivation of the negative electrode.

Model Description and Parameters

The above-discussed electrode design/construction is modeled according to physical phenomena that take place in an organic radical-LCO composite cathode. The organic radical is swollen by the liquid electrolyte, forming a gel. Mass transport of the anion therefore occurs by liquid phase diffusion through the electrolyte. This explains why ORP is capable of such high rate capability—there is no solid-phase diffusion. The film of organic radical polymer is comprised of polymer, electrolyte and conductive additive. Electron transfer occurs at the interface between organic radical and conductive carbon (or LCO). Electron transport occurs through the conductive additive (and LCO). ORP is solvated by the electrolyte. Anions (e.g., $PF_6^-$) diffuse through the electrolyte to the ORP. $Li^+$ diffuses through the electrolyte to the LCO surface. Oxidation of the ORP is compensated by the reaction with anion from the electrolyte.

The model parameters utilized include, the cathode is comprised of a mixture of LCO, electrolyte, ORP, binder, and conductive additive. The listed volume fraction of ORP is that of the dry ORP. In reality, it swells in the electrolyte creating a gel mixture of ORP and electrolyte. The model treatment would be the same for the gel.

The LCO-PTMA composite positive electrode thickness is 75 the graphite negative electrode thickness is 70 μm, and the separator thickness is 16 μm. The electrolyte is assumed to comprise 1.25 M $LiPF_6$ in carbonate solvents at 23° C. The simulations include an AAM with a redox potential of 4.0 V, a capacity of 111 mAh/g, and density of 1.2 g/cm$^3$. These properties are representative of AAM such as poly(9,9-dioctylfluorene) (a conjugated polymer) or PTMA (an organic radical polymer) with electron-withdrawing substituents. Additional information pertaining to modeling parameters are described in detail in in K. Thomas-Alyea and M. Aryanpour, J. Electrochem. Soc. 2017 vol. 164 p. A6017.

It is to be understood that, the foregoing description merely illustrates and does not limit the scope of the embodiments described. Numerous alternatives and equivalents exist. Other aspects, advantages, and modifications will be apparent to those skilled in the art to which the embodiments pertain.

What is claimed is:

1. A positive electrode having a front region adjacent to a separator and a back region adjacent to a current collector, the positive electrode comprising:
    an anion-absorbing material comprising an organic radical polymer, a conjugated polymer, or a combination thereof; and
    a cation-absorbing material, wherein the positive electrode exhibits a compositional profile such that the anion-absorbing material is present at a higher volume percent at the back region than at the front region.

2. The positive electrode of claim 1, wherein the composition profile is a graded type of compositional profile.

3. The positive electrode of claim 2, wherein the graded compositional profile is a smooth gradient compositional profile.

4. The positive electrode of claim 2, wherein the graded compositional profile is a stepwise compositional profile.

5. The electrode of claim 2, wherein the graded composition profile is provided as a plurality of regions having different volume percentages of the anion-absorbing material and/or of the cation-absorbing material, the regions including at least the front and back regions.

6. The positive electrode of claim 5, wherein the front region comprises about 0 to about 4 volume percent of the anion-absorbing material.

7. The positive electrode of claim 5, wherein the back region comprises about 5 to about 20 volume percent of the anion-absorbing material.

8. The positive electrode of claim 7, wherein the back region comprises about 8 to about 12 volume percent of the anion-absorbing material.

9. The positive electrode of claim 1, wherein the anion-absorbing material includes a polymer or a carbonaceous material.

10. The positive electrode of claim 9, wherein the polymer is comprised monomer units of one or more redox groups.

11. The positive electrode of claim 10, wherein the one or more redox groups include a nitroxyl group.

12. The positive electrode of claim 9, in which the polymer is a conjugated polymer.

13. The positive electrode of claim 12, wherein the back region comprises about 8 to about 12 volume percent of the anion-absorbing material.

14. The positive electrode of claim 1, wherein the organic radical polymer is a polymerization product of a nitroxyl radical, a spirobisnitroxides, a arylnitroxides, or a combination thereof.

15. The positive electrode of claim 14, wherein the organic radical polymer comprises poly(2,2,6,6-tetramethylpiperidinyloxy-4-yl methacrylate), poly(1-oxy-2,2,6,6-tetramethylpiperidin-4-yl vinyl ether), or a combination thereof.

16. The positive electrode of claim 1, wherein the conjugated polymer comprises a poly(thiophene), a poly(pyrrole), a poly(aniline), a poly(fluorene), or a combination thereof.

17. An electrochemical cell comprising:
    a negative electrode containing a negative electrode material;
    a positive electrode containing a positive electrode material;
    a separator having pores therein interposed between the negative and positive electrodes; and an electrolyte filling the separator and electrode pores, wherein the positive electrode
- has a front region adjacent to the separator and a back region adjacent to a current collector,
- comprises an anion-absorbing material and a cation-absorbing material, and
- exhibits a compositional profile such that the anion-absorbing material is present at a higher volume percent at the back region than at the front region, and
- wherein the anion-absorbing material comprises an organic radical polymer, a conjugated polymer, or a combination thereof.

18. The electrochemical cell of claim 17, wherein the cation comprises an alkali or alkaline-earth metal.

19. The electrolyte of claim 17, wherein the electrolyte contains water.

20. The electrolyte of claim 17, wherein the electrolyte is an ionic liquid.

21. The electrochemical cell of claim 17, wherein the electrolyte contains a solvent and a salt at a concentration of at least 2M.

22. The electrochemical cell of claim 21, wherein the salt is present at a concentration of about 3M to about 6M.

23. The electrochemical cell of claim 22, wherein the salt is present at a concentration of about 4.5M to about 6M.

24. The electrochemical cell of claim 17, wherein the front region comprises about 0 to about 4 volume percent of the anion-absorbing material.

25. The electrode of claim 17, wherein the back region comprises about 5 to about 20 volume percent of the anion-absorbing material.

26. A positive electrode having a front region adjacent to a separator and a back region adjacent to a current collector, the electrode comprising:
- an anion-absorbing material; and
- a cation-absorbing material,
- wherein the electrode exhibits a compositional profile such that the anion-absorbing material is present at a higher volume percent at the front region than at the back region.

* * * * *